United States Patent
Liu et al.

(10) Patent No.: US 10,940,672 B2
(45) Date of Patent: Mar. 9, 2021

(54) ALUMINUM MATRIX COMPOSITES AND METHOD THEREOF

(71) Applicants: Tsinghua University, Beijing (CN); HON HAI PRECISION INDUSTRY CO., LTD., New Taipei (TW)

(72) Inventors: Yuan-Feng Liu, Beijing (CN); Ze-Cheng Hou, Beijing (CN); Lu Chen, Beijing (CN); Lin Zhu, Beijing (CN); Wen-Zhen Li, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 22 days.

(21) Appl. No.: 16/287,659

(22) Filed: Feb. 27, 2019

(65) Prior Publication Data

US 2020/0164620 A1 May 28, 2020

(30) Foreign Application Priority Data

Nov. 22, 2018 (CN) .......................... 201811399570.7

(51) Int. Cl.
- *B32B 15/01* (2006.01)
- *B32B 38/00* (2006.01)
- *B32B 37/18* (2006.01)

(52) U.S. Cl.
CPC ............ *B32B 15/017* (2013.01); *B32B 37/18* (2013.01); *B32B 38/0012* (2013.01); *Y10T 428/12764* (2015.01)

(58) Field of Classification Search
None
See application file for complete search history.

(56) References Cited

FOREIGN PATENT DOCUMENTS

| CN | 105161698 | 12/2015 |
| CN | 107262726 | 10/2017 |
| CN | 108515085 | 9/2018 |

OTHER PUBLICATIONS

Toroghinejad, Mohammad Reza, et al, "Investigation of Nanostructured Aluminum/Copper Composite produced by Accumulative Roll Bonding and Folding Process," Materials and Design, 51 (2013) 274-279 (Year: 2013).*
Salimi, S., et al, "Fabrication of an Aluminum-Carbon Nanotube Metal Matrix Composite by Accumulative Roll-Bonding," J Mater Sci (2011) 46:409-415 (Year: 2011).*

* cited by examiner

*Primary Examiner* — Daniel J. Schleis
(74) *Attorney, Agent, or Firm* — ScienBiziP, P.C.

(57) ABSTRACT

A method for forming an aluminum matrix composite is provided. At least one reinforcement layer and an aluminum layer are provided. The at least one reinforcement layer is disposed on at least one surface of the aluminum layer to form a first composite structure. The first composite structure is pressed to form a second composite structure. A process of alternatively folding and pressing the second composite structure is repeated to form the aluminum matrix composite.

13 Claims, 6 Drawing Sheets

ALUMINUM MATRIX COMPOSITES AND METHOD THEREOF

CROSS-REFERENCE TO RELATED APPLICATIONS

This application claims all benefits accruing under 35 U.S.C. § 119 from China Patent Application No. 201811399570.7, filed on Nov. 22, 2018, in the China National Intellectual Property Administration, the contents of which are hereby incorporated by reference.

FIELD

The present disclosure relates to an aluminum matrix composite and a method for making the aluminum matrix composite.

BACKGROUND

An aluminum as a light metal material has advantages of low density, high electrical conductivity and high thermal conductivity, but its strength is generally low. Aluminum matrix composite is used in transmission wires, heat transfer and heat dissipation, automotive structural parts, aerospace and so on. Therefore, it is important to research the development of aluminum matrix composite with lightweight, high strength, and high conductivity.

The properties of the aluminum matrix composite mainly depend on type, content and dispersion state of reinforcements in the aluminum matrix, and interface states with the aluminum matrix. Reinforcements of the aluminum matrix composite includes hard compounds (intermetallic compounds, such as carbides, nitrides, oxides, etc.) and nano-carbon materials (such as carbon nanotubes, graphene, etc.). In order to obtain a high-strength aluminum matrix composite, a volume fraction of the hard compounds generally needs to reach a higher value. A high volume fraction of the hard compounds will seriously sacrifice the benefits of low density and high electrical conductivity of the aluminum matrix composite. Nano-carbon material has a low density and an excellent electrical conductivity, but the nano-carbon material tends to agglomerate in the aluminum matrix. In addition, equipment for preparing nano-carbon material reinforced aluminum matrix composite are generally expensive, and complicated to operate.

BRIEF DESCRIPTION OF THE DRAWINGS

Implementations of the present technology will now be described, by way of embodiments, with reference to the attached figures.

DETAILED DESCRIPTION

Figure 1:
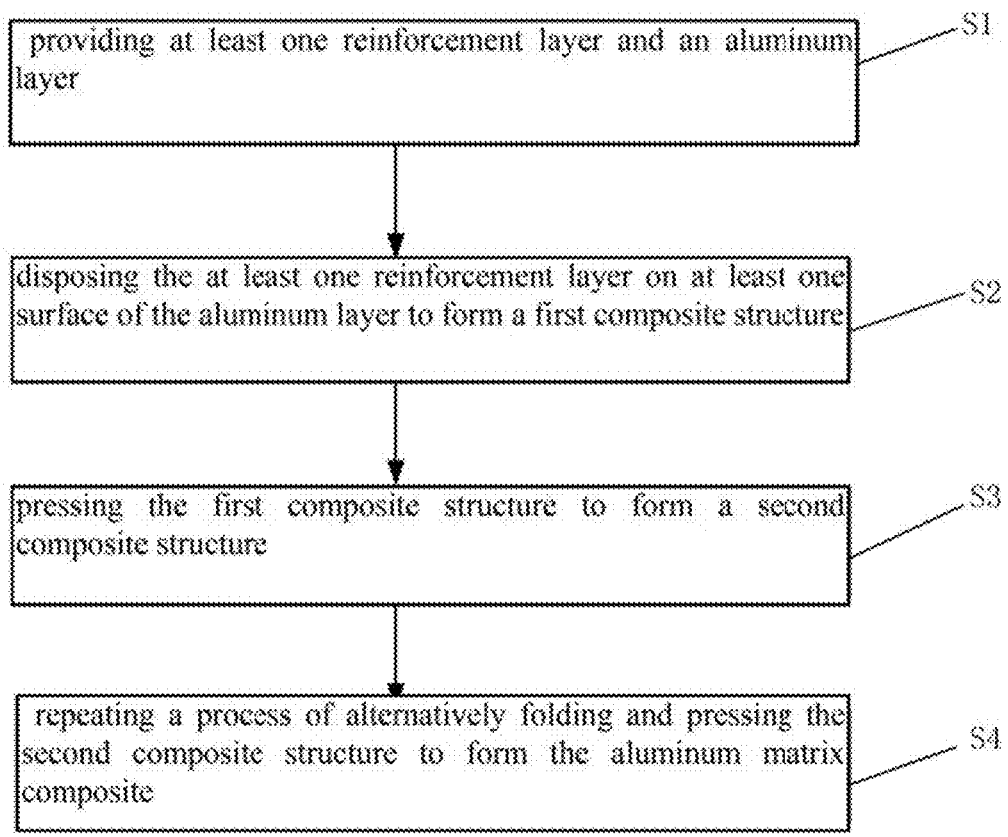
FIG. 1 is a flowchart of one embodiment of a method for making an aluminum matrix composite.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better.

Several definitions that apply throughout this disclosure will now be presented.

The term "comprise" or "comprising" when utilized, means "include or including, but not necessarily limited to"; it specifically indicates open-ended inclusion or membership in the so-described combination, group, series, and the like.

Figure 2:
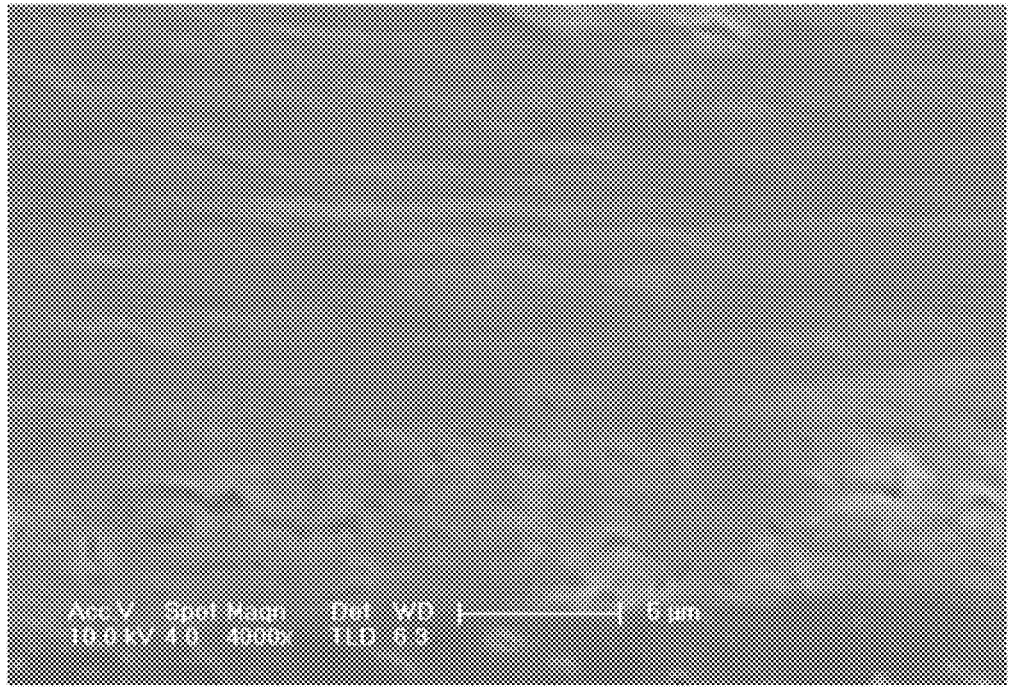
FIG. 2 is a scanning electron microscopy (SEM) of one embodiment of the cross section of the aluminum matrix composite formed by repeating a process of alternatively folding and pressing a second composite structure 8 times.

In FIG. 1 and FIG. 2, one embodiment is described in relation to a method for making an aluminum matrix composite. The method comprises steps of:

step (S1), providing at least one reinforcement layer and an aluminum layer;

step (S2), disposing the at least one reinforcement layer on at least one surface of the aluminum layer to form a first composite structure;

step (S3), pressing the first composite structure to form a second composite structure; and step (S4), repeating a process of alternatively folding and pressing the second composite structure to form the aluminum matrix composite.

In step (S1), the aluminum layer can be a commercially available aluminum sheet or may be manufactured as needed. The aluminum layer can be high purity aluminum or non-high purity aluminum. A thickness of the aluminum layer is ranged from about 0.01 mm to about 10 mm. In one embodiment, the thickness of the aluminum layer is 110 microns.

The reinforcement layer can be a pure metal layer or a metal matrix composite layer. The material of the pure metal layer is formed by one metallic element, such as copper, magnesium, zinc, nickel. The metal matrix composite layer can be a composite layer formed by combining the metal layer material with carbon nanotubes or graphene. A thickness of the reinforcement layer is ranged from about 0.01 mm to about 10 mm. In one embodiment, the reinforcement layer is a pure copper sheet, and a thickness of the pure copper sheet is 8 micrometers.

When the metal matrix composite material layer is formed by the metal layer and the carbon nanotubes, the carbon nanotube structure is not limited and comprises at least one carbon nanotubes. When the carbon nanotube structure comprises a plurality of carbon nanotubes, the plurality of carbon nanotubes can be randomly arranged, or the plurality of carbon nanotubes forms a film structure. The film structure comprises a drawn carbon nanotube film, a pressed carbon nanotube film, or a flocculated carbon nanotube film. When the carbon nanotubes form a film structure, the metal layer is stacked and laminated with the film structure.

The plurality of carbon nanotubes in the drawn carbon nanotube film are connected end to end by van der Waals force and arranged along a same direction. The plurality of carbon nanotubes in the pressed carbon nanotube film are disordered and arranged in the same direction or in different directions. The plurality of carbon nanotubes in the flocculated carbon nanotube film are attracted to each other by Van der Waals force and entangled to form a network structure comprising micropores.

In one embodiment, before step (S2), further comprising a step of degreasing the at least one reinforcement layer and the aluminum layer, which can make a bond force between the at least one reinforcement layer and the aluminum layer stronger. In one embodiment, the at least one reinforcement layer and the aluminum layer are ultrasonically degreased in an organic solvent, and then the at least one reinforcement layer and the aluminum layer are cleaned. The organic solvent can be acetone, or diethyl ether. The at least one reinforcement layer and the aluminum layer can be cleaned by pure water or alcohol after degreasing.

In one embodiment, the method further comprises a step of removing a metal oxide layer from surfaces of the at least one reinforcement layer and the aluminum layer before the step of degreasing the at least one reinforcement layer and the aluminum layer. In one embodiment, the at least one reinforcement layer and the aluminum layer can be rubbed to remove the metal oxide layer from surfaces of the at least one reinforcement layer and the aluminum layer. In one embodiment, the at least one reinforcement layer and the aluminum layer can be cleaned by an acidic solution to remove the metal oxide layer from surfaces of the at least one reinforcement layer and the aluminum layer. The acidic solution can be hydrochloric acid.

Before step S2, further comprising the step of scraping the surfaces of the reinforcement layer and the aluminum layer to expose fresh surface of the at least one reinforcement layer and the aluminum layer. An exposed fresh surface of the at least one reinforcement layer is directly in contact with an exposed fresh surface of the aluminum layer to make the bonding force between the at least one reinforcement layer and the aluminum layer stronger during subsequent pressing. In one embodiment, the at least one reinforcement layer and the aluminum layer are scraped with a metal brush, so that the exposed fresh surface of the at least one reinforcement layer is directly in contact with the exposed fresh surface of the aluminum layer.

In step (S2), as long as at least one surface of the aluminum layer is covered by the reinforcement layer, a manner of laminating the reinforcement layer and the aluminum layer is not limited. The reinforcement layer can be disposed on one surface of the aluminum layer, or the reinforcement layer can be disposed on opposite two surfaces of the aluminum layer, or the aluminum layer can be disposed on opposite two surfaces of the reinforcement layer.

In one embodiment, a quantity of the at least one reinforcement layer is one, the reinforcement layer is disposed on one surface of the aluminum layer, or the reinforcement layer wraps the aluminum layer; or the aluminum layer wraps the reinforcement layer. When the reinforcement layer is disposed on one surface of the aluminum layer, the reinforcement layer is laminated with the aluminum layer and covers at least a portion of the aluminum layer to form the first composite structure. When the reinforcement layer wraps the aluminum layer, the reinforcement layer is folded into a "U" shape, and the aluminum layer is placed in a hollow portion of the "U" type to form a sandwich structure (the first composite structure). The sandwich structure comprises a first reinforcement layer, the aluminum layer and a second reinforcement layer. The first reinforcement layer and the second reinforcement layer are integrated structures. That is, The first reinforcement layer and the second reinforcement layer form one reinforcement layer. The reinforcement layer can completely cover the aluminum layer. When the aluminum layer wraps the reinforcement layer, the aluminum layer is folded into a "U" shape, and the reinforcement layer is placed in a hollow portion of the "U" shape to form a sandwich structure (the first composite structure). The sandwich structure includes a first aluminum layer, the reinforcement layer and a second aluminum layer. The first aluminum layer and the second aluminum layer are integrated structures. That is, first aluminum layer and the second aluminum layer form one aluminum layer. The aluminum layer can completely cover the reinforcement layer.

In one embodiment, a quantity of the at least one reinforcement layer is larger than or equal to two, a plurality of the reinforcement layers are disposed on one surface of the aluminum layer, or disposed on the opposite surfaces of the aluminum layer. When the plurality of the reinforcement layers are disposed on one surface of the aluminum layer, the plurality of reinforcement layers are stacked on one surface of the aluminum layer, and cover at least a portion of the aluminum layer to form the first composite structure. The aluminum layer comprises a first surface and a second surface, and the first surface is opposite to the second surface. When the plurality of reinforcement layers are disposed on the first surface and the second surface of the aluminum layer, at least one of the reinforcement layer is disposed on the first surface of the aluminum layer, and at least one of the reinforcement layer is disposed on the second surface of the aluminum layer to form a sandwich structure, that is, the first composite structure. The reinforcement layer disposed on the first surface and the reinforcement layer disposed on the second surface are two structures, not a integrated structure.

In one embodiment, the number of the at least one reinforcement layer is two. The reinforcement layer is a copper sheet. The two copper sheets are respectively disposed on the first surface and the second surface of an aluminum sheet to form the first composite structure. One copper sheet completely covers the first surface of the aluminum sheet, and one copper sheet completely covers the second surface of the aluminum sheet.

Before step S2 after step S3, further comprising the step of cutting an edge of the first composite structure, to make an edge of the aluminum layer overlap with an edge of the at least one reinforcement layer.

In step (S3), a method of pressing the first composite structure is not limited, and it is only necessary to ensure that a thickness of the first composite structure is reduced. The thickness of the first composite structure can be pressed by a rolling mill at room temperature. In one embodiment, the thickness of the second composite structure is less than or equal to 70% of the thickness of the first composite structure. In another embodiment, applying pressure to upper and lower surfaces of the first composite structure by the roll mill at room temperature, and making the thickness of the second composite structure being half of the thickness of the first composite structure.

During the pressing of the first composite structure, there are some cracks at the edge of the first composite structure due to continuous deformation of the first composite structure. In order to avoid the chipping of the first composite structure in the subsequent pressing, affecting the performance of the aluminum matrix composite, after step S3 before step S4, further comprising the step of cutting the edge of the first composite structure.

In one embodiment, in the process of pressing the first composite structure to form the second composite structure, after the thickness of the second composite structure is half of the thickness of the first composite structure, the edge of the second composite structure is cut 1 mm to remove the cracks.

In step (S4), the process of alternatively folding and pressing the second composite structure comprises: folding the second composite structure to form a folded composite structure, and then pressing the folded composite structure. The term "the folding and pressing process" when utilized, means "the process of alternatively folding and pressing the second composite structure". A method of folding the second composite structure is not limited. In one embodiment, the second composite structure is folded in half, and the thickness is doubled. In another embodiment, in order to avoid forming the chipping of the composite structure in the subsequent pressing to affect the properties of the aluminum matrix composite, the cracks at the edge of the formed composite structure can be cut off after each the folding and pressing process.

In one embodiment, in each the folding and pressing process, a thickness of the second composite structure after pressing decreases to less than 70% of a thickness of the second composite structure after folding. In another embodiment, in each the folding and pressing process, a thickness of the second composite structure after pressing decreases to less than 50% of a thickness of the first composite structure after folding. In one embodiment, the folding and pressing process is repeated more than two times. In one embodiment, the folding and pressing process is repeated 2~16 times. In one embodiment, the folding and pressing process is repeated 4~16 times. The number of the folding and pressing process depends on the thickness of the aluminum layer and the reinforcement layer, and a anticipated comprehensive properties of the aluminum matrix composite. The comprehensive properties of the aluminum matrix composite refer to strength, hardness, and electrical conductivity of the aluminum matrix composite.

Figure 3:
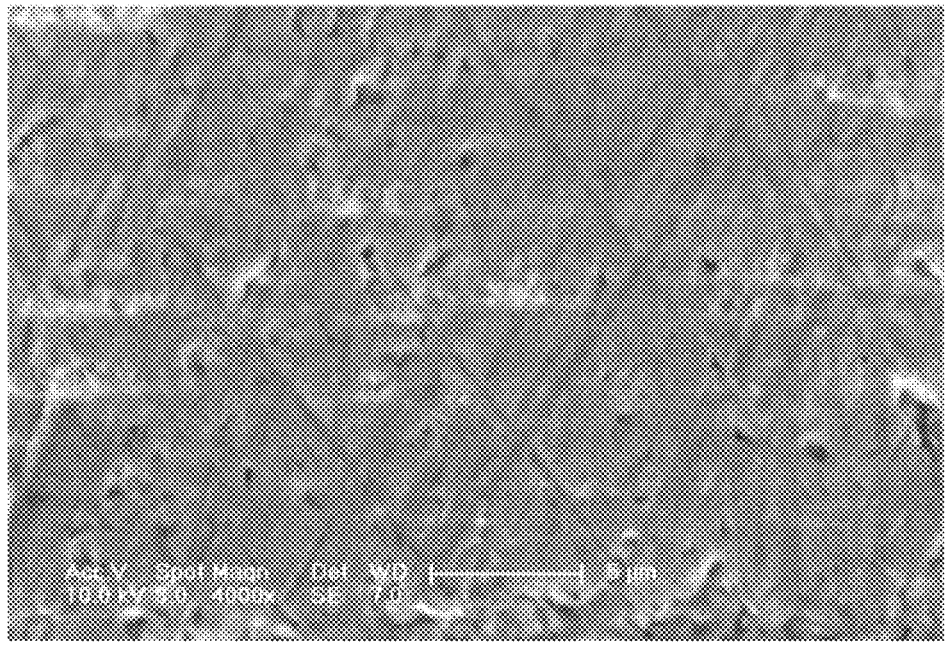
FIG. 3 is a SEM image of one embodiment of the cross section of the aluminum matrix composite formed by repeating a process of alternatively folding and pressing the second composite structure 10 times.

A color of the aluminum matrix composite is closer to the color of the aluminum layer when the number of the folding and pressing process increases, which indicates that the reinforcement layer becomes thinner when the number of the folding and pressing process increases. As shown in FIG. 2 and FIG. 3, the reinforcement layer becomes a plurality of reinforcement sheets when the folding and pressing process increases. The plurality of reinforcement sheets are uniformly dispersed in the aluminum layer. In addition, when the number of the folding and pressing process increases, a size of the plurality of reinforcement sheets are reduced, and the plurality of reinforcement sheets are more uniformly dispersed in the aluminum matrix composite. The size of the plurality of reinforcement sheets depends on the original thickness of the reinforcement layer and the number of the folding and pressing process. The average thickness of the plurality of reinforcement sheets can be in ranged from several tens of micrometers to several tens of nanometers, and the average length of the plurality of reinforcement sheets can be in ranged from several hundreds of millimeters to several hundreds of micrometers. The average length refers to a length in a direction perpendicular to the thickness of the plurality of reinforcement sheets. In one embodiment, when the folding and pressing process is repeated 8 times, the average thickness of the plurality of reinforcement sheets is about 500 nm, and the average length of the plurality of reinforcement sheets is about 100 μm. Further, a gloss and flatness of the surface of the aluminum matrix composite also improve with the increase in the number of the folding and pressing process.

A tensile strength of the aluminum matrix composite increases with the increase in the number of the folding and pressing process. The main reasons are as follows: First, the second composite structure undergoes a large plastic deformation during the folding and pressing process, thereby causing work hardening. Therefore, a hardness of the aluminum matrix composite is improved. At the same time, grains refinement is caused and sizes of the grains are effectively reduced during the folding and pressing process. Therefore, a strength of the aluminum matrix composite is improved. Second, the reinforcement layer itself is strengthened during the folding and pressing process, and an interface bonding force between the reinforcement layer and the aluminum layer continuously becomes stronger with the increase of the folding and pressing process, thereby playing a significant second phase strengthening effect.

An aluminum matrix composite according to one embodiment is provided. The aluminum matrix composite comprises at least one reinforcement layer and an aluminum layer. In one embodiment, the aluminum matrix composite consists of at least one reinforcement layer and the aluminum layer. The at least one reinforcement layer comprises a plurality of reinforcement sheets, and the plurality of reinforcement sheets are uniformly dispersed in at least a portion of the aluminum layer. The average thickness of the plurality of reinforcement sheets can be in ranged from several tens of micrometers to several tens of nanometers, and the average length of the plurality of reinforcement sheets can be in ranged from several hundreds of millimeters to several hundreds of micrometers. In one embodiment, when the folding and pressing process is repeated 8 times, the average thickness of the plurality of reinforcement sheets is about 500 nm, and the average length of the plurality of reinforcement sheets is about 100 μm.

The aluminum layer can be a commercially available aluminum sheet or may be prepared as needed. The aluminum layer can be high purity aluminum or non-high purity aluminum. A thickness of the aluminum layer is ranged from about 0.01 mm to about 10 mm. In one embodiment, the thickness of the aluminum layer is 110 microns.

The reinforcement layer can be a pure metal layer or a metal matrix composite layer. The material of the pure metal layer is formed by one metallic element, such as copper, magnesium, zinc or nickel. The metal matrix composite layer can be a composite layer formed by combining the metal layer material with carbon nanotubes or graphene. A thickness of the reinforcement layer is ranged from about 0.01 mm to about 10 mm. In one embodiment, the reinforcement layer is a pure copper sheet, and a thickness of the pure copper sheet is 8 micrometers.

When the metal matrix composite material layer is formed by the metal layer and the carbon nanotubes, the carbon nanotube structure is not limited and comprises at least one carbon nanotubes. When the carbon nanotube structure comprises a plurality of carbon nanotubes, the plurality of carbon nanotubes can be randomly arranged, or the plurality of carbon nanotubes forms a film structure. The film structure comprises a drawn carbon nanotube film, a pressed carbon nanotube film, or a flocculated carbon nanotube film. When the carbon nanotubes form a film structure, the metal layer is stacked and laminated with the film structure.

The plurality of carbon nanotubes in the drawn carbon nanotube film are connected end to end by van der Waals force and arranged along a same direction. The plurality of carbon nanotubes in the pressed carbon nanotube film are disordered and arranged in the same direction or in different directions. The plurality of carbon nanotubes in the flocculated carbon nanotube film are attracted to each other by Van der Waals force and f entangled to form a network structure with micropores.

In one embodiment, the reinforcement layer is a single pure metal layer. The reinforcement sheet is a metal sheet, and at least part of the plurality of metal sheets are uniformly dispersed in the aluminum layer. In one embodiment, the reinforcement layer is a metal matrix composite layer. At least part of the metal and the carbon nanotube or graphene in the metal matrix composite layer are uniformly dispersed in the aluminum layer.

Embodiment 1

Two copper sheets and one aluminum sheet are provided. A thickness of the copper sheet is 8 μm. The copper sheet is a pure copper sheet prepared by electroplating. A thickness of the copper sheet is 110 μm. The aluminum sheet is a pure aluminum sheet. Firstly, the copper sheet and the aluminum sheet are cleaned with hydrochloric acid to remove the oxide layer. Secondly, the copper sheet and the aluminum sheet are degreased with pure water and alcohol. Then the surfaces of the aluminum sheet and the copper sheet are scraped by a metal brush. So that the surfaces of the aluminum sheet and the copper sheet exposes a portion of the fresh metal surface. The aluminum sheet is sandwiched between two copper sheets, and the two copper sheets and the aluminum sheets are laminated to form a first composite structure. A surface of the roll is cleaned before pressing the first composite structure. The surface of the roll is scrubbed with a soft, dust-free paper soaked with alcohol to completely remove impurities on the surface of the roll. After the roll cleaning operation is completed, the first composite structure is pressed by the roll to form a second composite structure, and the thickness of the second composite structure is half of the thickness of the first composite structure. Then, edges of the second composite structure are cut by 1 mm to remove cracks. The aluminum matrix composite is formed by repeating the folding and pressing process 4 times, 6 times, 8 times, 10 times, and 12 times. After each the folding and pressing process is completed, the cracks at the edge of the composite structure is cut off.

FIG. 2 is a SEM photograph of a cross section of the aluminum matrix composite formed by repeating the folding and pressing process 8 times in the rolling direction. FIG. 3 is a SEM photograph of a section of the aluminum matrix composite formed by repeating the folding and pressing process 10 times in the rolling direction. As shown in FIG. 2 and FIG. 3, a plurality of copper metal nanosheets are dispersed in the metal aluminum sheet. As the number of the folding and pressing process increases, a thickness of the copper metal nanosheets becomes thinner, a size of the copper metal nanosheets becomes smaller, and the plurality of copper metal nanosheets are more uniformly dispersed in the metal aluminum sheet.

Figure 4:
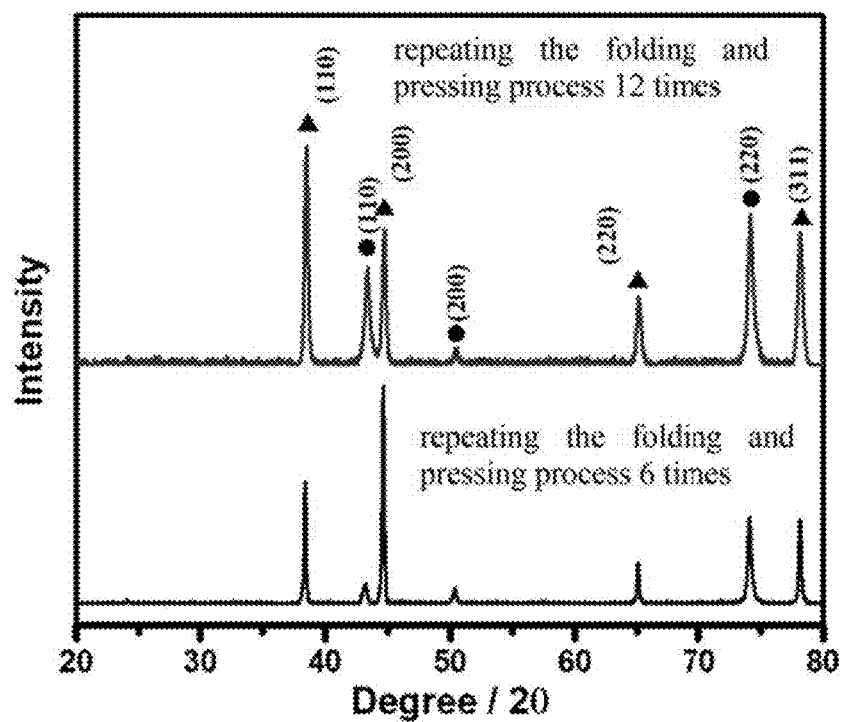
FIG. 4 is an X-Ray diffraction (XRD) pattern of one embodiment of the aluminum matrix composite formed by repeating a process of alternatively folding and pressing the second composite structure 6 times and 12 times.

FIG. 4 is an XRD pattern of an aluminum matrix composite formed by repeating the folding and pressing process 6 times and 12 times. As shown in FIG. 4, diffraction peaks of (110) and (220) crystal faces of copper and aluminum in the aluminum matrix composite are remarkably enhanced, mainly relevant to preferred orientations of (110) and (220) crystal faces during the folding and pressing process. According to Schmit's law, the preferred orientations of (110) and (220) crystal faces reduces orientation factors of the aluminum matrix composite in the pressing direction, and improves a deformation resistance of the aluminum matrix composite in the pressing direction. In addition, as shown in FIG. 4, in the aluminum matrix composite formed after repeating the folding and pressing process 12 times, the diffraction peak has a significant broadening effect, which indicates that the grains refinement phenomenon in the aluminum matrix composite is significantly remarked, and there is significant micro-strain inside the grains. The grains refinement phenomenon and micro-strain will increase the strength of the aluminum matrix composite.

Figure 5:
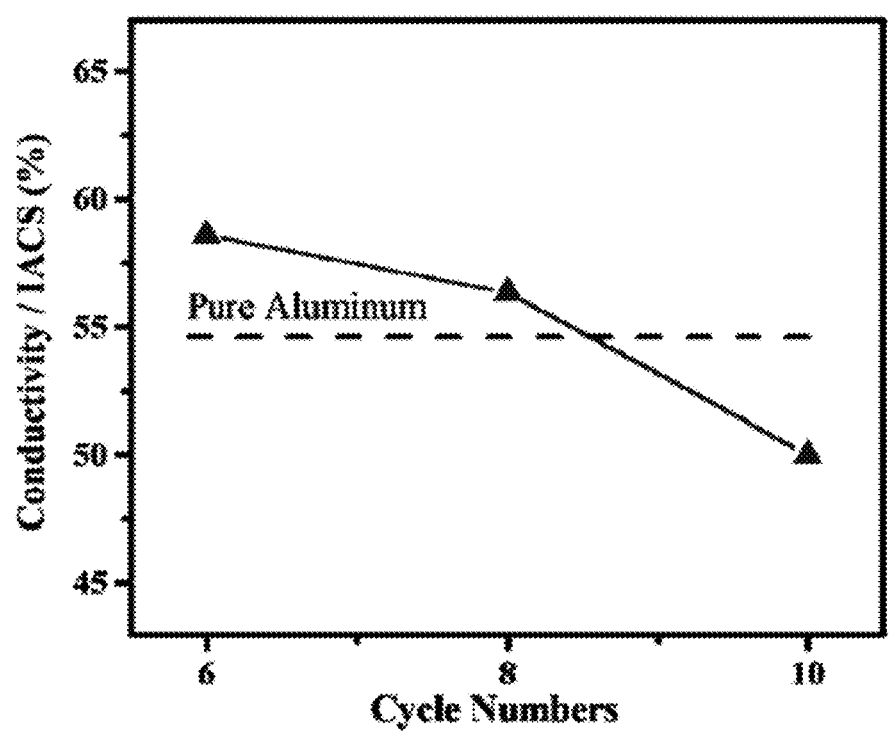
FIG. 5 is conductivity test chart of one embodiment of a pure aluminum and the aluminum matrix composite formed by repeating a process of alternatively folding and pressing the second composite structure 6 times, 8 times and 12 times.

FIG. 5 shows the conductivity of an aluminum matrix composite formed by repeating the folding and pressing process 6 times, 8 times, and 10 times. As shown in FIG. 5, the electrical conductivity of the aluminum matrix composite decreases with the increase of the number of the folding and pressing process, which is mainly due to a large amount of deformation of the aluminum matrix composite material and an uniformly dispersion of the reinforcing phase metal of the refinement layer in the aluminum. However, even then, the aluminum matrix composite formed by repeating the folding and pressing process 10 times maintains a high electrical conductivity of 50% IACS, slightly lower than that of untreated pure aluminum.

Figure 6:
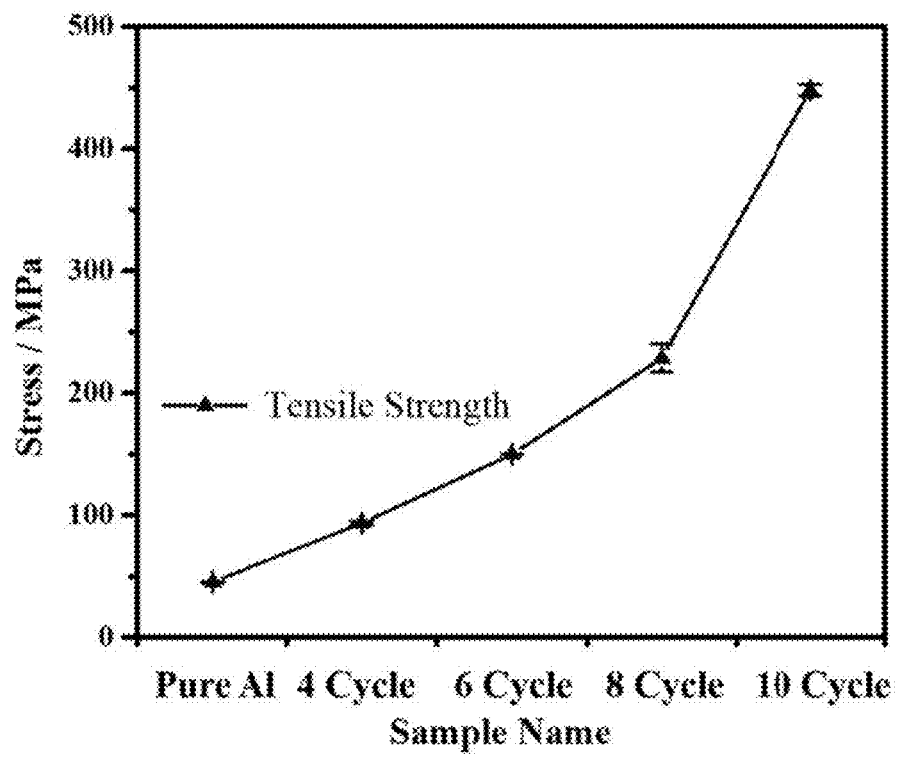
FIG. 6 is tensile strength test chart of one embodiment of a pure aluminum and the aluminum matrix composite formed by repeating a process of alternatively folding and pressing the second composite structure 4 times, 6 times, 8 times and 10 times.

FIG. 6 is a tensile strength test diagram of an aluminum matrix composite and pure aluminum formed by repeating the folding and pressing process 4 times, 6 times, 8 times, and 10 times. As shown in FIG. 6, the tensile strength of the aluminum matrix composite increases continuously with the increase of the number of repeating the folding and pressing process. The tensile strength of the aluminum matrix composite formed by repeating the folding and pressing process 10 times can reach 450 MPa. The tensile strength of pure aluminum formed by repeating the folding and pressing process 10 times is 50 MPa.

The aluminum matrix composite formed by repeating the folding and pressing process 8 times has a density of 3.08 g/cm$^3$. Since the copper sheet is prepared by electroplating, the density of copper sheet is lower than that of the dense copper sheet. At the same time, a cutting process of edges is performed during repeating the process of alternatively folding and pressing the second composite structure. Therefore, the density of the aluminum matrix composite is slightly lower than the theoretical density of 3.48 g/cm$^3$. The aluminum matrix composite obtained in the present invention has a lower density, and mass of the aluminum matrix composite is reduced. Therefore, the aluminum matrix composite can be widely used in devices that require weight reduction.

The method for making an aluminum matrix composite has the following characteristics. Firstly, a variety of different metal layers or metal matrix composites can be used as the reinforcing phase to form the aluminum matrix composite. So the aluminum matrix composite can have special properties by different properties of metal components. Second, the method is convenient and efficient and without complicated and expensive equipment. The method can be carried out at room temperature. Third, the number of the process of alternatively folding and pressing the second composite structure can be controlled to form the aluminum matrix composite with different mechanical strengths and excellent electrical conductivity. The preparation process is stable, the applicability is strong, and the volume fraction of the metal reinforcing phase can be controlled in a wide range. The preparation of the aluminum matrix composite has low cost, low energy consumption and no pollution. Fourth, the aluminum matrix composite has good surface gloss and high strength, and high electrical conductivity.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

Depending on the embodiment, certain of the steps of methods described may be removed, others may be added, and the sequence of steps may be altered. It is also to be understood that the description and the claims drawn to a method may comprise some indication in reference to certain steps. However, the indication used is only to be viewed for identification purposes and not as a suggestion as to an order for the steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will, therefore, be appreciated that the embodiments described above may be modified within the scope of the claims.

What is claimed is:

1. A method for making an aluminum matrix composite, comprising:
    S1: providing at least one reinforcement layer and an aluminum layer;
    S2: disposing the at least one reinforcement layer on at least one surface of the aluminum layer to form a first composite structure, wherein the at least one reinforcement layer comprises a metal layer and a carbon nanotube structure, the carbon nanotube structure comprises a plurality of carbon nanotubes connected end to end by van der Waals force and arranged along a same direction;
    S3: pressing the first composite structure to form a second composite structure; and
    S4: repeating a process of alternatively folding and pressing the second composite structure to form the aluminum matrix composite.

2. The method of claim 1, further comprising a step of degreasing the at least one reinforcement layer and the aluminum layer before S2.

3. The method of claim 1, further comprising a step of scraping surfaces of the at least one reinforcement layer and the aluminum layer to expose fresh surfaces of the at least one reinforcement layer and the aluminum layer before S2.

4. The method of claim 1, wherein a quantity of the at least one reinforcement layer is one, the reinforcement layer is folded into a "∪" shape, and the aluminum layer is placed in a hollow portion of the "∪" shape to form the first composite structure.

5. The method of claim 1, wherein a thickness of the at least one reinforcement layer ranges from about 0.01 mm to about 10 mm.

6. The method of claim 1, wherein a quantity of the at least one reinforcement layer is larger than or equal to two.

7. The method of claim 6, wherein the aluminum layer comprises a first surface and a second surface, the first surface is opposite to the second surface, and the at least one reinforcement layer is respectively disposed on the first surface and the second surface.

8. The method of claim 1, further comprising a step of cutting an edge of the first composite structure after S2 before S3.

9. The method of claim 1, wherein a thickness of the second composite structure is less than or equal to 70% of a thickness of the first composite structure in S3.

10. The method of claim 1, wherein a thickness of the second composite structure after pressing decreases to less than 70% of a thickness of the second composite structure after folding in S4.

11. The method of claim 1, wherein the process of alternatively folding and pressing the second composite structure is repeated more than two times.

12. The method of claim 1, wherein a material of the metal layer is copper, magnesium, zinc, or nickel.

13. A method for making an aluminum matrix composite, comprising:
    S1: providing at least one reinforcement layer and an aluminum layer;
    S2: disposing the at least one reinforcement layer on at least one surface of the aluminum layer to form a first composite structure, wherein the at least one reinforcement layer comprises a metal layer and grapheme;
    S3: pressing the first composite structure to form a second composite structure; and
    S4: repeating a process of alternatively folding and pressing the second composite structure to form the aluminum matrix composite.

* * * * *